Apr. 24, 1923.
F. C. ATWOOD
CANNULA AND CLAMP
Filed Jan. 24, 1921
1,452,863
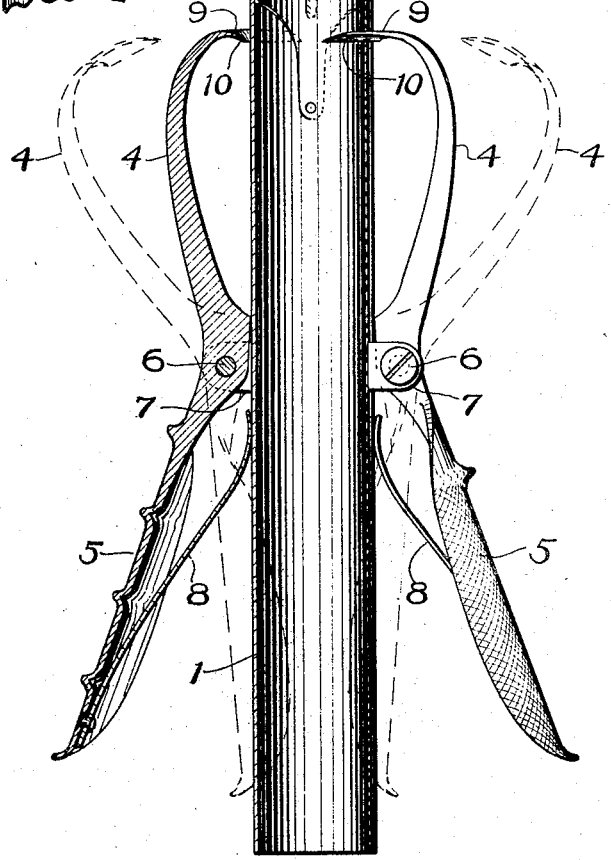
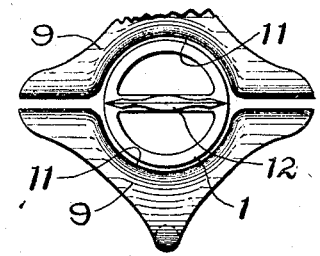
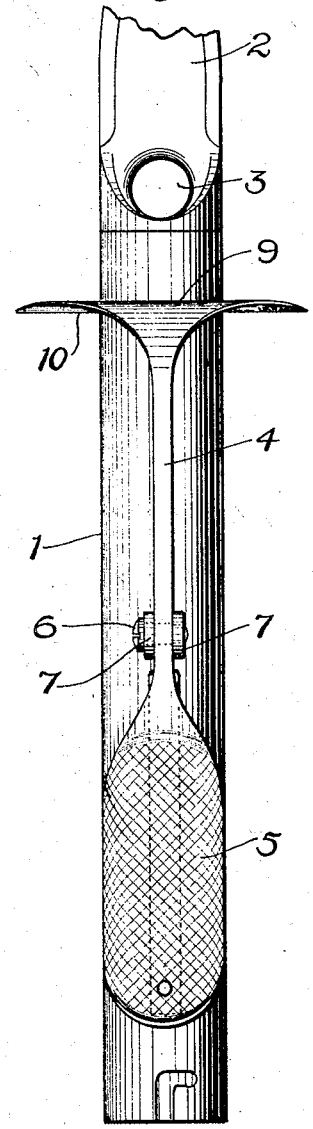
FIG. 4  FIG. 3
FIG. 1  FIG. 2
INVENTOR.
Francis C. Atwood
BY Roberts, Roberts & Cushman
ATTORNEYS Patented Apr. 24, 1923.

1,452,863

UNITED STATES PATENT OFFICE.

FRANCIS C. ATWOOD, OF NEWTON, MASSACHUSETTS, ASSIGNOR TO KALMUS, COMSTOCK & WESCOTT, INC., OF BOSTON, MASSACHUSETTS, A CORPORATION OF MASSACHUSETTS.

CANNULA AND CLAMP.

Application filed January 24, 1921. Serial No. 439,340.

*To all whom it may concern:*

Be it known that I, FRANCIS C. ATWOOD, a citizen of the United States, and resident of Newton, in the county of Middlesex and State of Massachusetts, have invented new and useful Improvements in Cannulas and Clamps, of which the following is a specification.

This invention relates to a cannula or trocar for collecting blood from food animals at the time of slaughter, and its principal object is to provide novel and improved means by which the instrument will retain itself in the incision in the animal to be bled, and close the lips of the incision around the cannula.

In the accompanying drawings which illustrate a preferred embodiment of the invention—

Figure 1 is a longitudinal section of the instrument, partly in elevation;

Figure 2 is a side elevation of the instrument viewed at right angles to Figure 1, partly broken away;

Figure 3 is a plan view of the forward end of the instrument; and

Figure 4 is a side view of the blade.

By way of illustration the invention is shown embodying a trocar of the type described in Letters Patent of the United States No. 1,333,745 granted to me March 16, 1920. It is to be understood however, that this trocar is merely used as one example of many forms of trocar to which the invention may be applied, and that the invention is applicable to other forms of trocars and also even to a cannula without a perforating blade.

1 represents the cannula or tube for conveying the blood from the interior of the animal to a flexible pipe or tubing (not shown) attached to the lower or rear end of the cannula, and thence to a suitable container. A perforator blade 2 is fixed to the forward end of the cannula, and as herein shown is provided with an aperture 3 to admit the blood to flow freely from either side of the blade into the entrance of the cannula. As already stated the particular form of blade is not essential to the present invention.

A pair of jaws 4, 4, are pivotally mounted on opposite sides of the cannula 1, and each jaw 4 is provided with an integrally formed, rearwardly extending actuating lever or handle 5. Each jaw is pivoted to the cannula by a pivot pin 6 extending through a pair of lugs or ears 7, 7 fixed to the sides of the cannula; and each jaw is yieldingly urged toward the cannula by means of a spring 8 fixed to the under side of the operating lever 5 and bearing against the cannula.

The forward or operating end of each jaw comprises a flattened blade-like member 9 which extends inwardly in the direction of the cannula. The edge or extremity of the member 9 facing the walls of the cannula is sharpened as shown at 10 and is preferably slightly inclined rearwardly the better to grip the body and prevent the instrument from being withdrawn from the incision. Each jaw member 9 is also preferably made of greater breadth than the diameter of the cannula so as to extend laterally a substantial distance at either side of the cannula, as shown, and is recessed as shown at 11 (Fig. 3) to conform approximately to the exterior form of the cannula. Thus the sharpened operating ends of the jaws not only cooperate with the sides of the cannula to grip the lips of an incision between the jaws and the cannula, but also cooperate with each other at both sides of the cannula to pinch the body therebetween. This arrangement not only affords a more extensive and firm gripping area than that merely between the jaws and the cannula, but also tightly closes the ends of the incision, which is usually somewhat longer than the diameter of the cannula, and snugly closes it around the cannula thus preventing the escape of blood outside of the cannula.

It is believed that the operation of the device will be clear from the foregoing description with only a brief explanation. The operator seizes the levers 5 in his hand and presses them together thereby opening the jaws 4 to the position shown in broken lines in Figure 1. In this position the instrument is thrust into the body of the animal in such manner that the blade 2 will enter a large blood vessel. The cut may be made wholly by the blade 2; or the initial incision may be made through the skin and outer tissues with a separate knife and finished with the blade 2; or if the blade 2 is omitted and the instrument used merely as a cannula the incision is wholly made by a separate knife and the cannula then inserted.

In either case the jaws 4 being open will not enter the incision but will engage the outside of the animal at each side of the incision. In that position the operator will release the levers 5 and the jaws will then close, actuated by springs 8, gripping the lips of the incision between the jaws and the cannula, and between the lateral extensions of the jaws at each side of the cannula, thus closing the cut tightly around the forward end of the cannula and at the same time holding the instrument in place in the incision, where it will retain itself until the draining of the blood is completed and the operator again opens the jaws to withdraw the instrument.

I claim:

1. A cannula for use in withdrawing blood from cattle comprising a hollow body portion capable of being inserted into an incision in the skin and tissues of the animal and having jaws capable of engaging and gripping the skin and tissue forming the lips of the incision between the jaws and the body portion.

2. A cannula for use in withdrawing blood from cattle comprising a hollow body portion capable of being inserted into an incision in the skin and tissues of the animal and having jaws yieldingly urged toward the body portion and capable of engaging and gripping the skin and tissues forming the lips of the incision between the jaws and the body portion of the cannula.

3. A trocar for use in withdrawing blood from cattle comprising a cannula and a blade mounted thereon, the cannula comprising a hollow body portion capable of being inserted into an incision in the skin and tissues of the animal, and having jaws capable of engaging and gripping the skin and tissue forming the lips of the incision between the jaws and the body portion.

4. A trocar for use in withdrawing blood from cattle comprising a cannula and a blade mounted thereon, the cannula comprising a hollow body portion capable of being inserted into an incision in the skin and tissues of the animal, and having jaws yieldingly urged toward the body portion and capable of engaging and gripping the skin and tissues forming the lips of the incision between the jaws and the body portion of the cannula.

5. A cannula for use in withdrawing blood from cattle comprising a hollow body portion capable of being inserted into an incision in the skin and tissues of the animal and having jaws for engaging and gripping the skin and tissues forming the lips of the incision between the jaws and the cannula, and operating levers for actuating said jaws.

6. A cannula for use in withdrawing blood from cattle comprising a hollow body portion capable of being inserted into an incision in the skin and tissues of the animal and having jaws yieldingly urged toward the cannula for engaging and gripping the skin and tissues forming the lips of the incision between the jaws and the cannula, and operating levers for actuating said jaws.

7. A cannula having jaws comprising sharpened ends extending inwardly in the direction of the cannula cooperating with the cannula to grip the lips of an incision between the jaws and the cannula.

8. A cannula having jaws comprising sharpened ends extending inwardly in the direction of the cannula cooperating with the cannula to grip the lips of an incision between the jaws and the cannula, and means yieldingly to urge the jaws toward the cannula.

9. A cannula having jaws comprising flattened, sharpened, blade-like ends extending inwardly in the direction of the cannula, cooperating with the cannula to grip the lips of an incision between the jaws and the cannula.

10. A cannula having jaws comprising flattened, sharpened, blade-like ends recessed to conform approximately to the exterior form of the cannula, and extending inwardly in the direction of the cannula, cooperating with the cannula to grip the lips of an incision between the jaws and the cannula.

11. A cannula having jaws comprising flattened, sharpened, blade-like ends of greater breadth than the diameter of the cannula and recessed to conform approximately to the exterior form of the cannula, extending inwardly in the direction of the cannula, cooperating with the cannula to grip the lips of an incision between the jaws and the cannula.

12. A cannula having jaws the operating ends of which extend laterally in each direction beyond the sides of the cannula, said jaws being adapted to cooperate with the cannula and also with each other at both sides of the cannula to grip the lips of an incision therebetween.

Signed by me at Boston, Massachusetts, this twenty-first day of January, 1921.

FRANCIS C. ATWOOD